(12) United States Patent
Brown (10) Patent No.: US 10,243,972 B2
(45) Date of Patent: Mar. 26, 2019

(54) CORRELATION-BASED DETECTION OF EXPLOIT ACTIVITY

(71) Applicant: CrowdStrike, Inc., Irvine, CA (US)

(72) Inventor: Daniel W. Brown, Beverly, MA (US)

(73) Assignee: CrowdStrike, Inc., Irvine, CA (US)

( * ) Notice: Subject to any disclaimer, the term of this patent is extended or adjusted under 35 U.S.C. 154(b) by 132 days.

(21) Appl. No.: 15/096,027

(22) Filed: Apr. 11, 2016

(65) Prior Publication Data
US 2017/0295190 A1  Oct. 12, 2017

(51) Int. Cl.
*H04L 29/06* (2006.01)
*G06F 21/55* (2013.01)
*H04W 12/12* (2009.01)

(52) U.S. Cl.
CPC .......... *H04L 63/1416* (2013.01); *G06F 21/55* (2013.01); *H04L 63/14* (2013.01); *H04L 63/20* (2013.01); *H04W 12/12* (2013.01)

(58) Field of Classification Search
None
See application file for complete search history.

(56) References Cited

U.S. PATENT DOCUMENTS

| | | | |
|---|---|---|---|
| 9,934,376 B1 * | 4/2018 | Ismael | G06F 9/45558 |
| 10,033,759 B1 * | 7/2018 | Kabra | H04L 63/1466 |
| 2002/0046275 A1 | 4/2002 | Crosbie et al. | |
| 2003/0233566 A1 * | 12/2003 | Kouznetsov | G06F 21/56 726/22 |
| 2005/0229250 A1 * | 10/2005 | Ring | G06F 21/57 726/23 |
| 2007/0143850 A1 | 6/2007 | Kraemer et al. | |
| 2007/0282951 A1 * | 12/2007 | Selimis | H04L 67/06 709/205 |
| 2008/0046964 A1 * | 2/2008 | Muralidharan | G06F 21/6227 726/1 |
| 2008/0134176 A1 * | 6/2008 | Fitzgerald | G06F 9/45537 718/1 |
| 2009/0254970 A1 | 10/2009 | Agarwal et al. | |
| 2011/0252476 A1 * | 10/2011 | Loveland | G06F 21/552 726/24 |
| 2013/0326623 A1 | 12/2013 | Kruglick | |
| 2013/0333040 A1 * | 12/2013 | Diehl | G06F 9/46 726/24 |

(Continued)

OTHER PUBLICATIONS

The Extended European Search Report dated Jun. 1, 2017 for European patent application No. 17162189.9, 8 pages.

*Primary Examiner* — Farid Homayounmehr
*Assistant Examiner* — Olanrewaju J. Bucknor
(74) *Attorney, Agent, or Firm* — Lee & Hayes, P.C.

(57) ABSTRACT

A security agent implemented on a monitored computing device is described herein. The security agent is configured to receive an event notification indicative of execution of an object and store, in a data structure on the monitored computing device, information associated with the event notification and the object. The security agent is further configured to receive an event notification indicative of an occurrence on the monitored computing device of an activity. Based at least in part on the stored information, the security agent correlates the occurrence of the activity with the execution of the object and generates an exploit detection event based on the correlating.

17 Claims, 5 Drawing Sheets

(56) References Cited

U.S. PATENT DOCUMENTS

| | | | |
|---|---|---|---|
| 2014/0109226 A1* | 4/2014 | Diehl | G06F 9/46 |
| | | | 726/24 |
| 2014/0115624 A1* | 4/2014 | Chen | H04N 21/25 |
| | | | 725/25 |
| 2015/0101044 A1* | 4/2015 | Martin | G06F 21/552 |
| | | | 726/22 |
| 2015/0278518 A1* | 10/2015 | Pereira | G06F 21/554 |
| | | | 726/23 |
| 2016/0078229 A1* | 3/2016 | Gong | G06F 21/577 |
| | | | 726/24 |
| 2017/0223030 A1* | 8/2017 | Merza | H04L 63/1416 |
| 2017/0286678 A1* | 10/2017 | Huang | G06F 21/562 |
| 2017/0293758 A1* | 10/2017 | Saxena | G06F 21/552 |
| 2017/0339178 A1* | 11/2017 | Mahaffey | H04L 41/142 |

* cited by examiner

CORRELATION-BASED DETECTION OF EXPLOIT ACTIVITY

BACKGROUND

With Internet use forming an ever greater part of day to day life, security exploits that steal or destroy system resources, data, and private information are an increasing problem. Governments and businesses devote significant resources to preventing intrusions and thefts related to these security exploits. Security exploits come in many forms, such as computer viruses, worms, trojan horses, spyware, keystroke loggers, adware, and rootkits. These exploits are delivered in or through a number of mechanisms, such as spearfish emails, clickable links, documents, executables, or archives. Some of the threats posed by security exploits are of such significance that they are described as cyber terrorism or industrial espionage.

To counter these threats, governments, enterprises, and individuals use a range of security applications and services. Typically, these applications and services scan a device for a signature of a security exploit. Responsive to finding the signature, the applications and services quarantine or delete the exploit. The applications and services often miss more sophisticated security exploits, however. For example, security applications and services lack an ability to correlate detected events. Such events may each, on their own, be innocent, but when observed together or in some sequence, the events may be indicative of security exploit activity.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

This disclosure describes, in part, a security agent implemented on a monitored computing device. The security agent is configured to receive an event notification indicative of execution of an object and store, in a data structure on the monitored computing device, information associated with the event notification and the object. The security agent is further configured to receive an event notification indicative of an occurrence on the monitored computing device of an activity. Based at least in part on the stored information, the security agent correlates the occurrence of the activity with the execution of the object and generates an exploit detection event based on the correlating.

In various embodiments, the object may be any process or thread executing on the monitored computing device. For example, the object may be an Internet browser plug-in thread or email application thread. Such objects may be specific objects of interest that are known to be vulnerable to security exploits. Further, when compromised by a security exploit, the object may perform one of a number of specific activities that are indicative of the security exploit. For example, when an Internet browser plug-in thread is compromised, activities such as command line interface (CLI) creation, process migration, installation, or portable executable (PE) creation and execution may be indicative of compromise of the Internet browser plug-in thread by a security exploit.

The security agent may be configured to detect correlations of the occurrence of such activities with the execution of objects and to generate exploit detection events to drive preventative action or exploit tracking. To receive the necessary information to perform such correlating, the security agent may be configured with a filter or logic which receives event notifications and processes those event notifications based on a policy received from a remote security service.

In one implementation, the filter or logic may receive the event notifications, determine that they pertain to objects or activities of interest (e.g., based on the policy), generate further event notifications which provide further information about the objects or activities (e.g., indications of the types of the objects or the activities), and provide those further event notifications to a correlator of the security agent. Such a correlator may first receive and store information about an event notification pertaining to execution of an object and about the object itself and then subsequently receive a notification of occurrence of an activity of interest. Based on a correlation index which may relate the types of that object and that activity, the correlator may generate the exploit detection event.

In another implementation, rather than utilizing a correlator, the filter or logic may store the information about the event notification pertaining to execution of the object and about the object itself in a data structure and then, upon receiving an event notification of occurrence of an activity of interest, retrieve information from the data structure and, based on the policy, generate an exploit detection event.

The security agent may then either take preventative action based on the exploit detection event, provide the exploit detection event to the remote security service, or both. In response, the remote security service may update the policy utilized by the filter or logic or update the configuration of the security agent.

Example Event Model

Figure 1A:
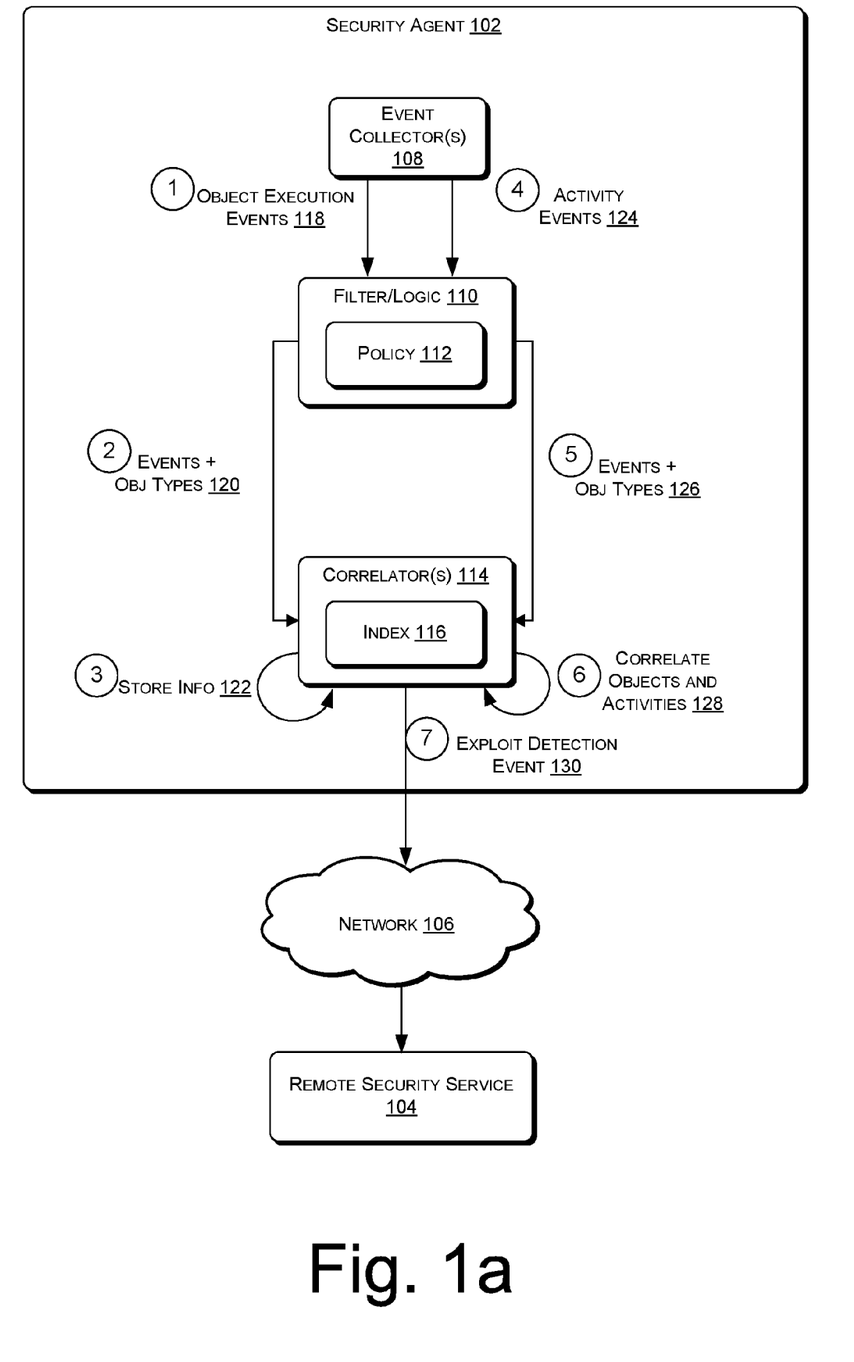
FIGS. 1a-1b illustrate example overviews of security agents implemented on monitored computing devices and actions taken by those security agents to detect exploits.
Figure 1B:
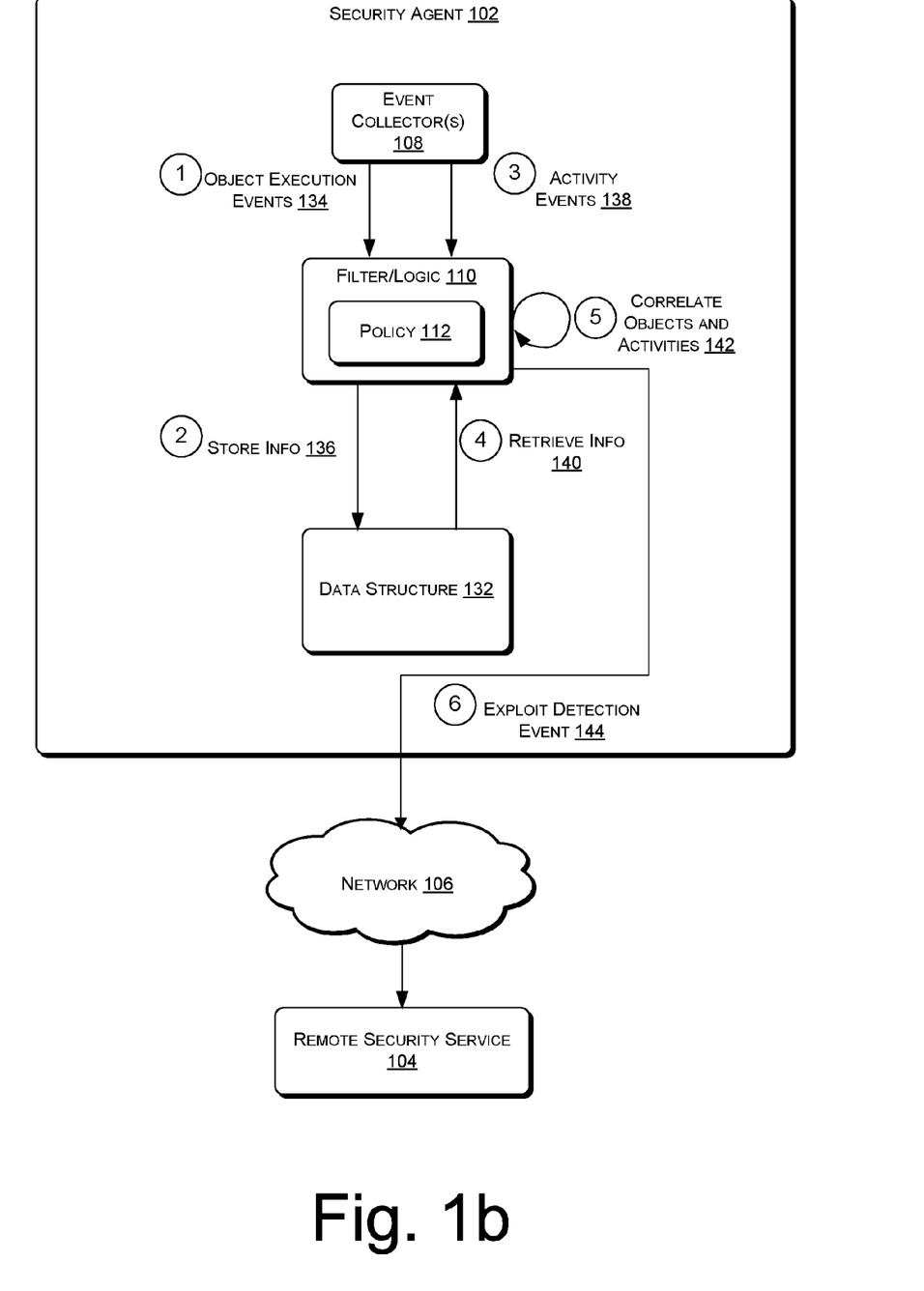

FIGS. 1a-1b illustrate example overviews of security agents implemented on monitored computing devices and actions taken by those security agents to detect exploits. As illustrated in FIG. 1a, a security agent 102 may be configured by and communicate with a remote security service 104 over a network 106. The security agent 102 may include event collector(s) 108, a filter/logic 110 and policy 112, and correlator(s) 114 that each include an index 116. The filter/logic 110 receives, at 118, event notifications indicating execution of objects and, based on policy 112, generates, at 120, generalized event notifications which include object type fields. The filter/logic 110 then provides the generalized event notifications to correlator(s) 114 that store, at 122, information associated with those event notifications and objects. The filter/logic 110 then receives, at 124, event notifications indicating occurrence of activities and, based on policy 112, generates, at 126, generalized event notifications which include activity type fields. The filter/logic 110 then provides the generalized event notifications to correlator(s) 114 that correlate, at 128, the occurrence of the activities with the execution of the objects and generate, at 130, exploit detection events based on the correlating.

In various implementations, the computing device implementing the security agent 102 (referred to herein interchangeably as the "computing device" and the "monitored computing device") and the device(s) of the remote security service 104 may be connected by network 106. Network 106 may include any one or more networks, such as wired networks, wireless networks, and combinations of wired and wireless networks. Further, network 106 may include any one or combination of multiple different types of public or private networks (e.g., cable networks, the Internet, wireless networks, etc.). For example, the network 106 may be a private network. In some instances, computing devices communicate over the network 106 using a secure protocol (e.g., https) and/or any other protocol or set of protocols, such as the transmission control protocol/Internet protocol (TCP/IP).

Figure 3:
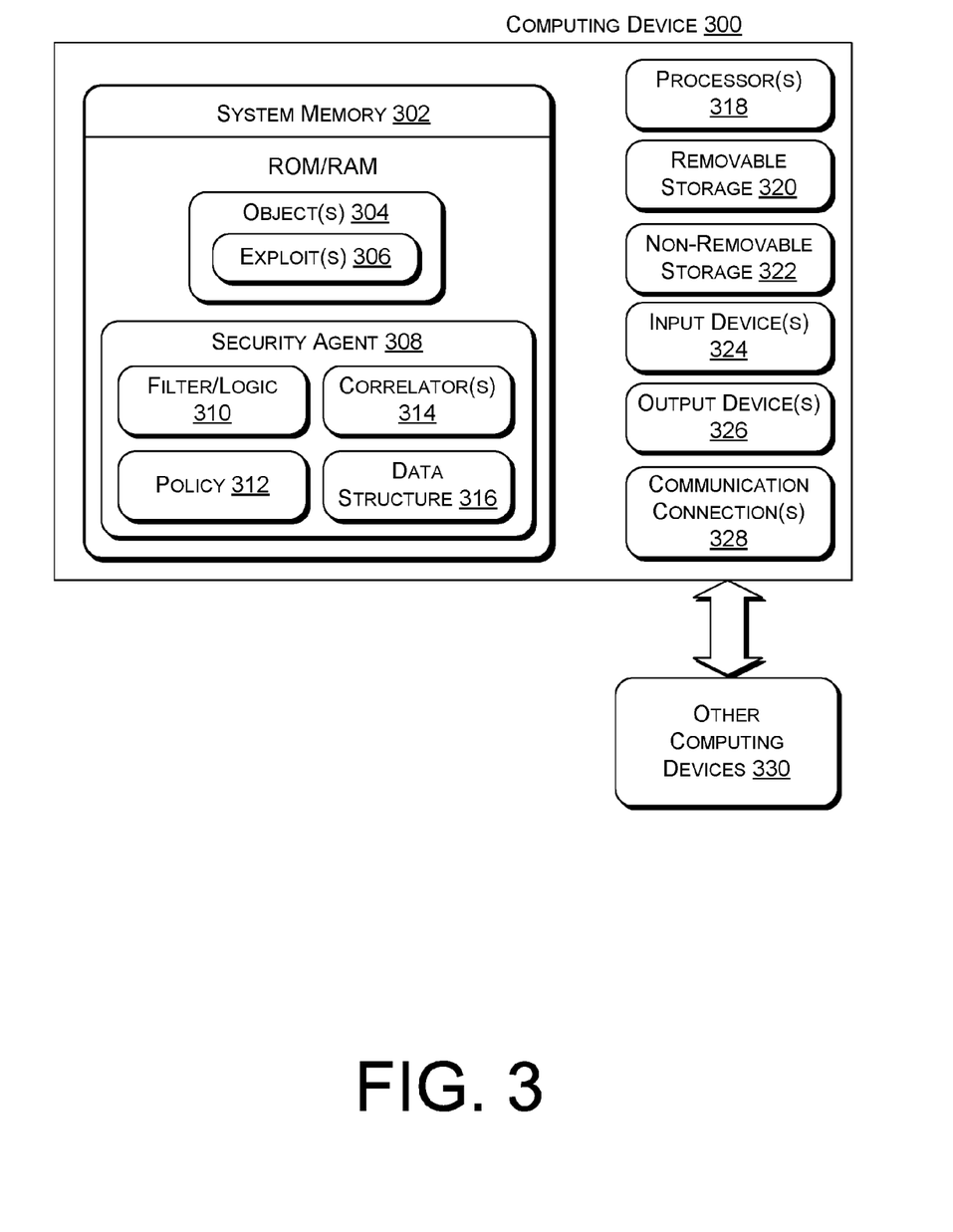
FIG. 3 illustrates a component level view of a monitored computing device configured with objects targeted by exploits and a security agent.

The computing device implementing the security agent 102 and the device(s) of the remote security service 104 may each be or include a server or server farm, multiple, distributed server farms, a mainframe, a work station, a personal computer (PC), a laptop computer, a tablet computer, a personal digital assistant (PDA), a cellular phone, a media center, an embedded system, or any other sort of device or devices. In one implementation, the device(s) of the remote security service 104 represent a plurality of computing devices working in communication, such as a cloud computing network of nodes. In some implementations, one or more of the computing device implementing the security agent 102 and the device(s) of the remote security service 104 represent one or more virtual machines implemented on one or more computing devices. An example computing device capable of serving as the computing device implementing the security agent 102 is illustrated in FIG. 3 and described below with reference to that figure.

In various implementations, remote security service 104 may provide security service(s) to the computing device implementing the security agent 102 and to any number of other computing devices implementing other instances of the security agent 102. The remote security service 104 may receive notifications of interesting events from security agent 102, including exploit detection event notifications, as well as forensic data associated with those interesting events. The remote security service 104 may determine if related notifications have been received from other instances of security agent 102 and/or evaluate the interesting event(s) based on one or more rules or heuristics. The remote security service 104 may further perform any or all of generating an event and providing the event to the security agent 102 (e.g., for diagnostic or healing purposes), generating a configuration update, generating an updated policy 112, healing the computing device implementing the security agent 102, deceiving an adversary associated with malicious code, or notifying entities or persons associated with the computing device implementing the security agent 102 of the potential malicious code. Upon generating a configuration update or updated policy 112, the remote security service 104 may provide the configuration update or updated policy 112 to the security agent 102.

In some implementations, the security agent 102 may be any sort of security agent, such as a security agent implemented at the kernel-level. As shown in FIG. 1a, the security agent 102 may include event collectors 108, filter/logic 110, a policy 112, correlator(s) 114, and correlator indices 116. In alternate or additional implementations, such as those shown in FIG. 1b, the security agent 102 may include a data structure 132. The security agent 102 may be installed by and configurable by the remote security service 104, receiving, and applying while live, reconfigurations of components of the security agent 102. Such reconfigurations may cause updates to any component(s) of the security agent 102, such as the event collector(s) 108, the filter/logic 110, the policy 112, the collector(s) 114, the correlator indices 116, or the data structure 132. The security agent 102 may perform at least one of monitoring events on the computing device implementing that security agent 102, maintaining state about some or all of the events on that computing device, notifying the remote security service 104 of one or more events on the computing device, or taking action responsive to a security exploit associated with one or more events on the computing device. An example security agent 102 is described in greater detail in U.S. patent application Ser. No. 13/492,672, entitled "Kernel-Level Security Agent" and filed on Jun. 8, 2012.

In various embodiments, the event collectors 108 observe all sorts of events, including events associated with objects or activities of interest. To receive the events, the event collector(s) 108 may register with hooks or filters to receive notifications of the occurrence or non-occurrence of certain the events associated with objects or activities of interest. An event collector 108 may also monitor locations in memory or log files, or spawn a thread to do so, observing events associated with the log files or memory locations. An event collector 108 may observe multiple kinds of events, or each type of event may be associated with a different event collector 108. The events observed by the event collectors 108 may be specified by a configuration of the security agent 102.

The event collector(s) 108 route observed events to the filter/logic 110. These observed events may include events associated with the creation or execution of objects (both "creation" and "execution" being referred to herein as "execution" of object(s)), which are routed at 118, and events associated with the occurrence of activities, which are routed at 124. The events routed at 118 are referred to herein as event notifications 118, and the events routed at 124 are referred to herein as event notifications 124. The event notifications 118 and 124 and other observed events/event notifications may be routed via an event bus, which may form part of the filter/logic 110 or be a separate component. The event bus may route events/event notifications between the components of the security agent 102.

Upon receiving an event notification 118 or 124, the filter/logic 110 may determine that the event notification 118 or 124 is associated with an object or activity of interest. Objects or activities of interest are objects or activities specified by a configuration of security agent 102 and/or by policy 112. Such objects of interest may include processes or threads of the computing device that may be vulnerable to security exploits (e.g., return-oriented programming (ROP) or shell-code). The activities of interest may include those that enable the exploit to gain persistence, migrate to other processes, steal credentials, etc. Example objects of interest may include Internet browser plug-in threads (e.g., Flash threads) or email application threads. When the object is an Internet browser plug-in thread, example activities may include command line interface (CLI) creation, process migration, installation, or portable executable (PE) creation and execution. The filter/logic 110 may, for example, determine that an event notification 118 is associated with an object of interest because a registry entry accessed as part of the event described in the event notification 118 is associated with an object specified by the configuration of security agent 102 and/or by policy 112.

Upon determining that an event described in an event notification 118/124 is associated with an object or activity of interest, the filter/logic 110 may gather additional information about the event and object/activity. For example, for objects of interest, the filter/logic 110 may gather an identifier associated with the object, an identifier of a process that owns the object, an identifier of the correlator 114 that handles the objects of a specific class (e.g., Internet browser plug-in threads), an identifier of a specific type of an object (e.g., Flash thread), and/or an indication of whether the object is a child object (and, if so, an indication of the identity of the parent object). For activities of interest, the filter/logic 110 may gather an identifier associated with the activity, an identifier of a process that performed the activity, and/or an identifier of a specific type of activity. Upon gathering additional information about the object of interest, the filter/logic 110 may generate a generalized event notification which includes both information from the event notification 118 and some or all of the additional information and may provide, at 120, the generalized event notification to the correlator 114 which handles the object's class. Such a generalized event notification may be referred to further herein as an event notification 120. In some implementations, if the object is a child object, the event notification 120 may include a tag identifying its parent object. Upon gathering additional information about the activity, the filter/logic 110 may generate a generalized event notification which includes both information from the event notification 124 and some or all of the additional information and may provide, at 126, the event through the event bus to one or more correlators 114. Such a generalized event notification may be referred to further herein as an event notification 126. In further implementations, the event notifications 120 and 126 may each include a timestamp indicative of a time, such as the time that the event collector(s) 108 observed the respective events associated with the event notifications 120 and 126.

In various implementations, upon receiving an event notification 120, a correlator 114 stores, at 122, information included in that event notification 120. The information may be stored in a table of the correlator 114 or in any sort of data structure.

Concurrently with or subsequent to storing the information, the correlator 114 may receive an event notification 126. Upon receiving an event notification 126, the correlator 114 may utilize information from the event notification 126, such as the activity type field, to query a correlator index 116 of the correlator 114. If a match is found—if the correlator index 116 includes an entry matching the activity type, then the correlator 114 determines the object type specified by that entry. If the correlator 114 previously received an event notification 120 specifying that object type and is storing the information for that event notification 120, then the correlator 114 will retrieve the information and correlate, at 128, the occurrence of the activity with the execution of the object. If the activity type is not included in the correlator index 116 or if the correlator 114 is not storing information associated with the corresponding object type, then the correlator 114 takes no further action.

In some implementations, each event notification 120/126 may include a timestamp, and the correlator index 116 may specify a minimum time lapse for each pair of activity type and object type. In such implementations, the correlating, at 128, may further be based on whether the difference between the timestamps meets or exceeds the minimum time lapse, with a correlation being determined to exist only when the difference meets or exceeds the minimum time lapse.

In further implementations, an event notification 126 may include an indication of a current context. For example, the event notification 126 may specify whether an Internet browser plug-in thread is active, whether a browser associated with the Internet browser plug-in thread is active, whether the browser associated with the Internet browser plug-in thread has browsed to a different page, etc. In such implementations, the correlating, at 128, may further be based on whether the current context indicated by the event notification 126 matches information stored by the correlator 114, with a correlation being determined to exist only when there is a match.

In some implementations, the correlator 114 may store information from both event notifications 120 and event notifications 126, and the correlator index 116 may include entries which correlate an object type with multiple, different activity types or with a count of received event notifications 126 associated with a specific activity type. Upon receiving an event notification 126, then, the correlator 114 may query the correlator index 116 and retrieve stored information associated with both a past event notification 120 and with past event notification(s) 126. For example, the correlator index 116 may associate the object type "Flash thread" with the activity type "CLI creation" and a count of "2" instances for the "CLI creation" activity type. Upon receiving an event notification 126 specifying a "CLI creation" activity type, the correlator 114 may query the correlator index 116, find the matching entry, and determine whether it stores information for an event notification 120 that specified "Flash thread" and information for an event notification 126 that specified "CLI creation." If so, then the correlator 114 determines that the conditions in the correlator index are met. If not, then the correlator 114 may store information for the event notification 126 specifying CLI creation and await further events.

In additional implementations, the correlator index 116 may include an entry that specifies a single activity type and either multiple, different object types, with parent and child objects, or a count of multiple events associated with a single object type. In such implementations, the correlator 114 may indicate that there is a correlation when an event notification 126 is received if information is stored for the multiple, different object types, with parent and child objects, or a count of multiple events associated with a single object type specified by the correlator index 116.

In some implementations, the "correlator 114" may comprise multiple, chained correlators 114. Such multiple chained correlators 114 may correspond to, e.g., parent and child objects, and the result of one correlator 114 may be based on another. For example, one correlator 114 may determine a correlation exists based on stored information associated with an event notification 120 and on the positive result of another correlator 114.

In various implementations, when a correlator 114 determines that there is a correlation (e.g., when an occurrence of an activity is correlated with the execution of an object), the correlator 114 generates an exploit detection event. In some implementations, the exploit detection event may specify a detection indicator. For example, an entry in the correlator index 116 may specify a detection indicator associated with a specific combination of object type, activity type, etc. Upon generating an exploit detection event (with or without a detection indicator), the correlator 114 may provide the exploit detection event to the event bus, which may route the event in accordance with a configuration of the security agent 102.

In addition to the implementations described above, FIG. 1b illustrates alternate implementations that utilize the filter/logic 110 and a data structure 132 in place of the correlator(s) 114. As illustrated in FIG. 1b, the filter/logic 110 may receive, at 134, an event notification associated with the execution of an object (referred to hereinafter as an event notification 134) and store, at 136, information associated with the event notification 134 and the object in the data structure 132. The filter/logic 110 may then receive, at 138, an event notification associated with the occurrence of an activity (referred to hereinafter as an event notification 138), retrieve, at 140, the information stored in the data structure 132, and correlate, at 142, the occurrence of the activity with the execution of the object based at least in part on the information stored in the data structure 132. Based on the correlating, the filter/logic 110 may then generate, at 144, an exploit detection event.

In various implementations, the filter/logic 110 may process event notifications 134 in the same manner described above for event notifications 118 in FIG. 1a to determine whether then describe the execution of objects of interest. The filter/logic 110 may also process event notifications 138 in the same manner described above for event notifications 124 in FIG. 1a to determine whether then describe the execution of activities of interest.

Responsive to determining that an event notification 134 describes the execution of an object of interest, the filter/logic 110 may gather additional information about the object of interest (e.g., an identifier associated with the object, an identifier of a process that owns the object, an identifier of a specific type of an object (e.g., Flash thread), and/or an indication of whether the object is a child object (and, if so, an indication of the identity of the parent object)). The filter/logic 110 may then store, at 136, both information from the event notification 134 and the additional information in the data structure 132.

The data structure 132 may be any sort of data structure, such as a table having an entry for each event notification 134 that is associated with an object of interest or entries for each object of interest. In some implementations, the data structure 132 may be part of an event model of the security agent 102 which serves as a focal point for storing information about system components of the monitored computing device, about events occurring on the monitored computing device, and about relationships between and among system components and events. In further implementations, the storing, at 136, may comprise adding entries to the data structure 132 or updating entries. For example, if the data structure includes an entry for each object of interest, multiple event notifications 134 may be received for a same object of interest. In such an example, the filter/logic 110 may update the entry for that object of interest with information from the most recent of the event notifications 134 relating to it.

Concurrently with or subsequent to performing the storing at 136, the filter/logic 110 may receive the event notification 138. Based on the configuration of the security agent 132 or the policy 112, the filter/logic 110 may determine an activity type associated with the event notification 138, determine any object or objects of interest associated with that activity type, and retrieve, at 140, information stored in the data structure 132 that is associated with that/those object(s) of interest. The filter/logic 110 may then correlate the occurrence of the activity with the execution of the object based at least in part on the event notification 138 and the information retrieved from the data structure 132.

In various implementations, when the filter/logic 110 determines that there is a correlation, the filter/logic 110 generates an exploit detection event. In some implementations, the exploit detection event may specify a detection indicator. For example, the configuration of the security agent 102 or the policy 112 may specify a detection indicator associated with a specific combination of object type, activity type, etc. Upon generating an exploit detection event (with or without a detection indicator), the filter/logic 110 may provide the exploit detection event to the event bus, which may route the event in accordance with a configuration of the security agent 102.

Following the generation of an exploit detection event as illustrated and described in either of FIG. 1a or FIG. 1b, the event bus may route the exploit detection event to either an actor of the security agent 102 (described further with reference to FIG. 2) to take preventative action or to a communication module of the security agent 102 (also described further with reference to FIG. 2) for transmission to the remote security service 104.

Examples of preventative processes can include stopping or preventing execution of the object associated with the exploit detection event, stopping or preventing execution of a process which includes the object, or causing the monitored computing device to reboot. The action taken may be a function of a detection indicator, in some implementations.

As noted above, the remote security service 104, if receiving an exploit detection event, may update a configuration of the security agent 102, the policy 112, or both, and may communicate such update(s) to the security agent 102 to drive further exploit detection.

Example Security Agent

Figure 2:
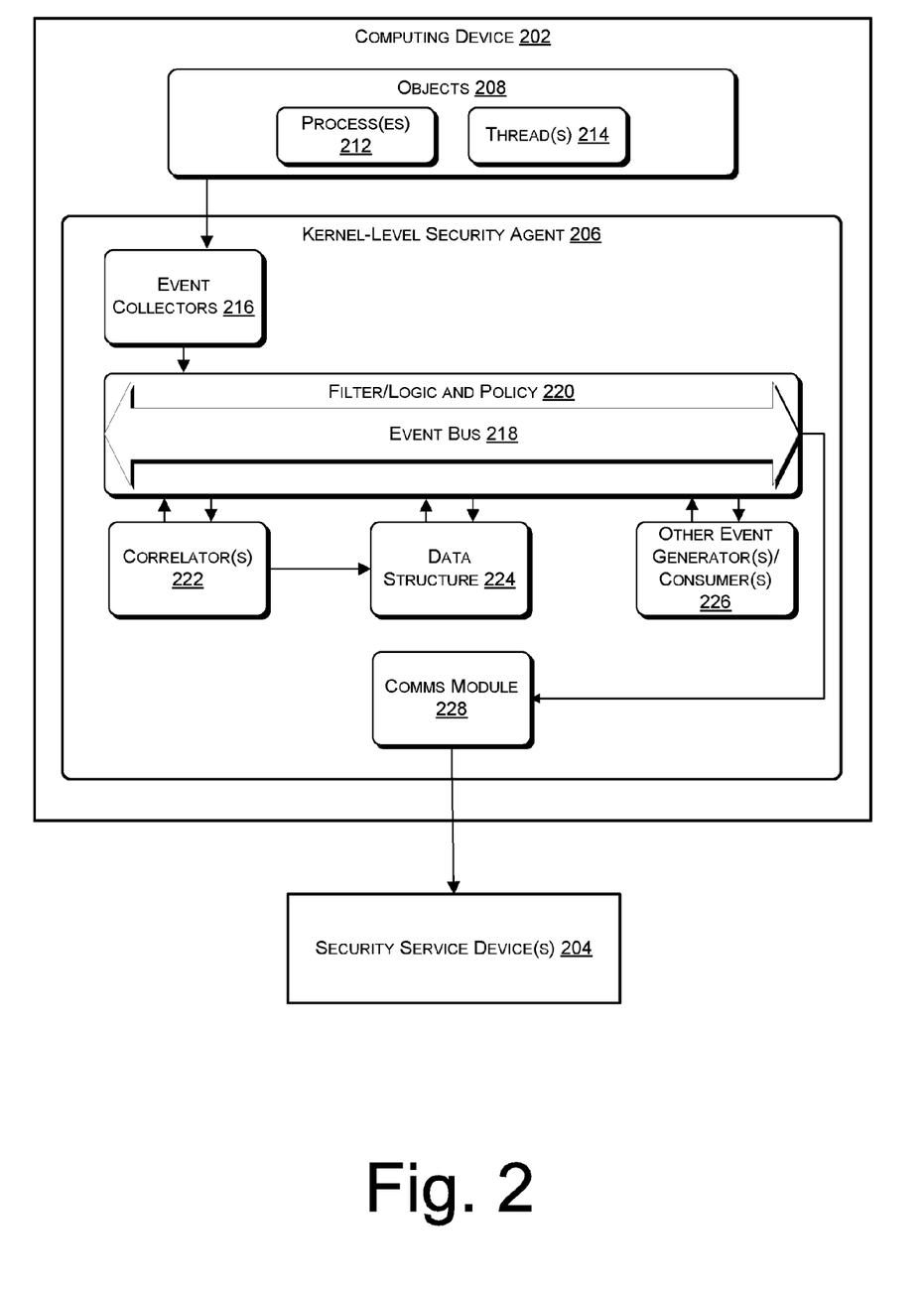
FIG. 2 illustrates an example security agent which includes a filter/logic for detecting and generating event notifications potentially relevant to security exploits, correlator(s) for detecting correlations indicative of exploit activity and generating exploit detection events, and a data structure for storing information associated with event notifications.

FIG. 2 illustrates an example security agent which includes a filter/logic for detecting and generating event notifications potentially relevant to security exploits, correlator(s) for detecting correlations indicative of exploit activity and generating exploit detection events, and a data structure for storing information associated with event notifications. As illustrated, a computing device 202 may receive security services from remote security service device(s) 204 working with a kernel-level security agent 206 installed on the computing device 202. The computing device 202 may include a plurality of objects 208, such as process(es) 212 and thread(s) 214. The kernel-level security agent 206 includes an event collector 216, an event bus 218, filter/logic and policy 220, correlator(s) 222, a data structure 224, other event generator(s)/consumer(s) 226, and a communication module 228.

In various embodiments, the computing device 202 and security service device(s) 204 and network may be same sort of devices, service, and network described above. Likewise, the security agent 206 may be an example of security agent 102, event collector 216 may be an example of an event collector 108, event bus 218 may be an example of the event bus described above with reference to FIGS. 1a-1b, filter/logic and policy 220 may be examples of filter/logic 110 and policy 112, correlator(s) 222 may be an example of correlator(s) 114, and data structure 224 may be an example of data structure 132.

In some implementations, the plurality of objects 208 may include any sort of components of the computing device 202, such as process(es) 212 and thread(s) 214. The plurality of objects 208 may also include trees, modules, or any other sort of components. For example, a thread 214 may be a vulnerable thread that is targeted by a security exploit. An example of such a thread—the Internet browser plug-in/Flash thread—and its activities is described above with respect to FIGS. 1a-1b.

As illustrated in FIG. 2, the event bus 218 and filter/logic and policy 220 may serve as routing, filtering, and analysis component(s) which connect the other components in the architecture of the security agent 206. The event bus 218 and filter/logic and policy 220 may receive events from other components and either route those received events, filter and route a subset of those received events, or analyze received events and generate and route further received events. The actions taken upon any received events by the event bus 218 and filter/logic and policy 220 may be driven by a configuration of the security agent 206 and the policy.

Event generator(s) and consumer(s) 226 may include modules that take actions, such as correlator(s) 222 and actors. Actors may receive events via the event bus 218 and take some action or actions based on the events. For example, an actor may receive an exploit detection event and take a preventative action based on the exploit detection event. Also or instead, the actor may store information associated with the event in the data structure 224 or communicate information associated with the event to the communication module 228 for transmission to the security service device(s) 204. In further implementations, upon receiving an exploit detection event, the actor may retrieve additional information from the data structure 224 and based on the exploit detection event and the additional information may take some action, such as a preventive action.

In various embodiments, the communications module 228 may represent network protocol stack(s), network interface driver(s), and any other network interface components utilized by the kernel-level security agent 206 to communicate with the security service device(s) 204 over one or more networks. The communications module 228 may be a kernel mode component of the computing device 202. Further, the communications module 228 may transmit events, other notifications, and data associated events from the kernel-level security agent 206 to the security service device(s) 204. The communications module 228 may also transmit configuration updates received from the security service device(s) 204 to a configuration manager of the kernel-level security agent 206 and healing instructions and/or events from the security service device(s) 204 to the event bus 218 for filtering and dispatch.

Example System

FIG. 3 illustrates a component level view of a computing device configured with objects targeted by exploits and a security agent. As illustrated, computing device 300 comprises a system memory 302 storing objects(d) 304 targeted by exploits 306 and a security agent 308 that includes a filter/logic 310, a policy 312, correlator(s) 314, and a data structure 316. Also, computing device 300 includes processor(s) 318, a removable storage 320 and non-removable storage 322, input device(s) 324, output device(s) 326 and communication connections 328 for communicating with other computing devices 330.

In various embodiments, system memory 302 is volatile (such as RAM), non-volatile (such as ROM, flash memory, etc.) or some combination of the two. The object 304 may be any sort of object, such as an process or thread that is compromised by a security exploit 306. Examples of such objects 304 and exploits 306 are examples of similarly named components described further herein. The security agent 308 and its filter/logic 310, policy 312, correlator(s) 314, and data structure 316 are also examples of similarly named components further describe herein.

In some embodiments, the processor(s) 318 is a central processing unit (CPU), a graphics processing unit (GPU), or both CPU and GPU, or other processing unit or component known in the art.

Computing device 300 also includes additional data storage devices (removable and/or non-removable) such as, for example, magnetic disks, optical disks, or tape. Such additional storage is illustrated in FIG. 3 by removable storage 320 and non-removable storage 322. Non-transitory computer-readable media may include volatile and nonvolatile, removable and non-removable media implemented in any method or technology for storage of information, such as computer readable instructions, data structures, program modules, or other data. System memory 302, removable storage 320 and non-removable storage 322 are all examples of non-transitory computer-readable storage media. Non-transitory computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by the computing device 300. Any such non-transitory computer-readable media may be part of the computing device 300.

Computing device 300 also has input device(s) 324, such as a keyboard, a mouse, a touch-sensitive display, voice input device, etc., and output device(s) 326 such as a display, speakers, a printer, etc. These devices are well known in the art and need not be discussed at length here.

Computing device 300 also contains communication connections 328 that allow the computing device 300 to communicate with other computing devices 330, such as the security service device(s) 204.

Example Process

Figure 4:
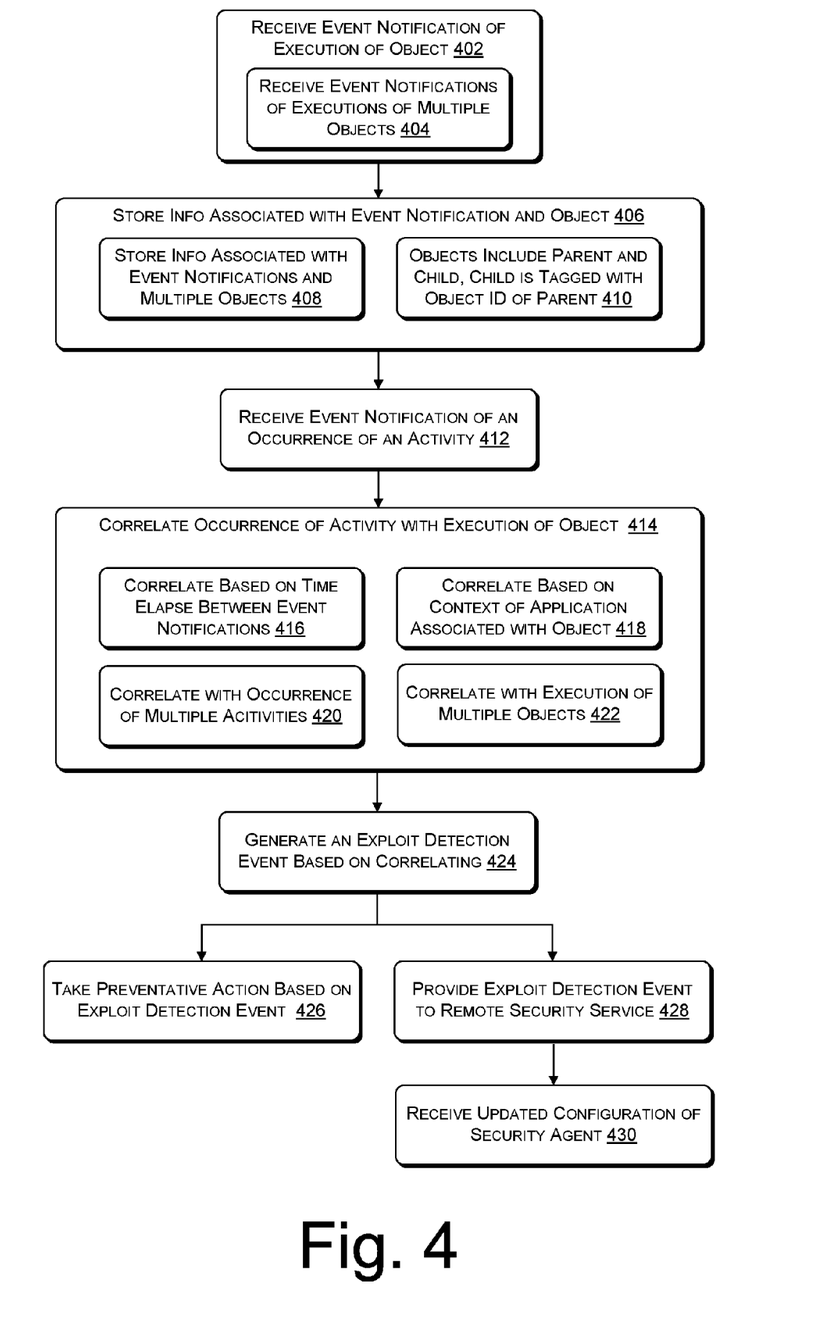
FIG. 4 illustrates an example process for receiving an event notification of execution of an object, storing information associated with the event notification and the object, receiving an event notification of occurrence of an activity, correlating the occurrence of the activity with the execution of the object, and generating an exploit detection event based on the correlating.

FIG. 4 illustrates an example process. This process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 4 illustrates an example process for receiving an event notification of execution of an object, storing information associated with the event notification and the object, receiving an event notification of occurrence of an activity, correlating the occurrence of the activity with the execution of the object, and generating an exploit detection event based on the correlating.

The process includes, at 402, receiving, by the security agent implemented on the monitored computing device, an event notification indicative of execution of an object. In various implementations, the object may be a process or a thread (e.g., an Internet browser plug-in thread or an email application thread). Further, the receiving may be based on a configurable policy of the security agent. At 404, the receiving may include receiving event notifications indicative of the executions of multiple related objects.

At 406, the security agent stores, in a data structure of the security agent on the monitored computing device, information associated with the event notification and the object. The stored information may include at least an identifier of the object and an object type of the object. In some implementations, the data structure may be part of a correlator of the security agent. Also, the storing may be based on a configurable policy of the security agent. At 408, the storing may comprise storing information associated with the event notifications and the multiple related objects. The multiple related objects may include at least a parent object and a child object, and the storing, at 410, may comprise tagging information associated with the child object with an object identifier or object type of the parent object.

At 412, the security agent receives an event notification indicative of an occurrence on the monitored computing device of an activity. The activity may be one of command line interface (CLI) creation, process migration, installation, or portable executable (PE) creation and execution. Further, the receiving may be based on a configurable policy of the security agent.

At 414, based at least in part on the stored information, the security agent correlates the occurrence of the activity with the execution of the object. The correlation of the occurrence of the activity with the execution of the object may be indicative of operation of a security exploit on the monitored computing device. In some implementations, the correlating may be based on a configurable policy of the security agent. At 416, the correlating may comprise correlating the occurrence of the activity with the execution of the object based on a time elapse between the event notification indicative of the execution of the object and the event notification indicative of the occurrence of the activity. At 418, the correlating may comprise correlating the occurrence of the activity with the execution of the object based on based on a context of an application associated with the object. At 420, the correlating may comprise correlating the occurrence of the activity with the execution of the object and with an occurrence of an additional activity. At 422, the correlating may comprise correlating the occurrence of the activity with the executions of the multiple related objects.

At 424, the security agent generates an exploit detection event based on the correlating. In some implementations, the generating may be based on a configurable policy of the security agent.

At 426, the security agent may take a preventative action based at least in part on the exploit detection event.

At 428, the security agent may provide the exploit detection event to a remote security service. In response, at 430, the security agent may receive an updated configuration of the security agent.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
 receiving, by a security agent implemented on a monitored computing device, an event notification indicative of execution of an object;
 storing, by the security agent, in a data structure of the security agent on the monitored computing device, information associated with the event notification and the object;
 receiving, by the security agent, an event notification indicative of an occurrence on the monitored computing device of an activity;
 based at least in part on the stored information, correlating, by the security agent, the occurrence of the activity with the execution of the object, wherein the correlation of the occurrence of the activity with the execution of the object is indicative of operation of a security exploit; and
 generating an exploit detection event, by the security agent, based on the correlating,
 wherein the receiving the event notification indicative of the execution of the object comprises receiving event notifications indicative of the executions of multiple related objects and the storing comprises storing information associated with the event notifications and the multiple related objects, and
 wherein the multiple related objects include at least a parent object and a child object, and the storing comprises tagging information associated with the child object with an object identifier or object type of the parent object.

2. The method of claim 1, wherein the object is a process or a thread.

3. The method of claim 1, wherein the object is an Internet browser plug-in thread or an email application thread.

4. The method of claim 3, wherein the activity is one of command line interface (CLI) creation, process migration, installation, or portable executable (PE) creation and execution.

5. The method of claim 1, wherein the stored information includes at least an identifier of the object and an object type of the object.

6. The method of claim 1, wherein the receiving the event notification indicative of the execution of the object, the storing, the receiving the event notification indicative of the occurrence of the activity, the correlating, and the generating are based on a configurable policy of the security agent.

7. The method of claim 1, wherein the correlating comprises correlating the occurrence of the activity with the execution of the object based on a time elapsed between the event notification indicative of the execution of the object and the event notification indicative of the occurrence of the activity.

8. The method of claim 1, wherein the correlating comprises correlating the occurrence of the activity with the execution of the object based on a context of an application associated with the object.

9. The method of claim 1, wherein the correlating comprises correlating the occurrence of the activity with the execution of the object and with an occurrence of an additional activity.

10. The method of claim 1, wherein the correlating comprises correlating the occurrence of the activity with the executions of the multiple related objects.

11. The method of claim 1, further comprising taking a preventative action, by the security agent, based at least in part on the exploit detection event.

12. The method of claim 1, further comprising providing, by the security agent, the exploit detection event to a remote security service.

13. The method of claim 12, further comprising, in response to the providing, receiving, by the security agent, an updated configuration of the security agent.

14. A monitored computing device comprising:
a processor; and
a security agent configured to be executed by the processor on the monitored computing device, the security agent including:
 a filter configured to receive a first event notification indicative of execution of an object, to generate a second event notification based on the first event notification which specifies an object type of the object, to receive a third event notification indicative of an occurrence on the monitored computing device of activity, and to generate a fourth event notification based on the third event notification which specifies an activity type of the activity, and
 a correlator configured to receive the second event notification, to store the second event notification, to receive the fourth event notification, to correlate the occurrence of the activity with the execution of the object based on the second event notification, the fourth event notification, and on a correlation index that specifies correlations which are indicative of operation of a security exploit, and to generate an exploit detection event based on the correlating,
wherein the correlator is a correlator instance and the security agent includes a different correlator instance for each object instance, and
wherein the security agent includes multiple, chained correlator instances, with a first correlator instance correlating the occurrence of the activity with the execution of the object, and a second correlator instance correlating an output of the first correlator instance with execution of another object, the other object being related to the object.

15. The monitored computing device of claim 14, wherein at least one of the second event notification or the fourth event notification includes additional information.

16. A monitored computing device comprising:
a processor; and
a security agent configured to be executed by the processor on the monitored computing device, the security agent including:
 a data structure configured to store information about at least one object, including an indicator of whether the object is executing, and
 logic configured to receive a first event notification indicative of execution of the at least one object, to update the data structure based on the first event notification, to receive a second event notification indicative of an occurrence on the monitored computing device of activity, to correlate the occurrence of the activity with the execution of the object based on the data structure, the second event notification, and on a policy that specifies correlations which are indicative of operation of a security exploit, and to generate an exploit detection event based on the correlating,
wherein the at least one object is an Internet browser plug-in thread or an email application thread, and
wherein the at least one activity is one of command line interface (CLI) creation, process migration, installation, or portable executable (PE) creation and execution.

17. The monitored computing device of claim 16, wherein the logic is further configured to update the data structure by adding an entry for the at least one object to the data structure or by updating an existing entry for the at least one object in the data structure based on the first event notification.

* * * * *